United States Patent

Odan et al.

[11] Patent Number: 5,865,496
[45] Date of Patent: Feb. 2, 1999

[54] DOOR STRUCTURE OF MOTOR VEHICLE

[75] Inventors: Seiji Odan, Trenton, Mich.; Hayato Okuda; Kuniaki Ishigami, both of Hiroshima, Japan

[73] Assignee: Mazda Motor Corporation, Hiroshima, Japan

[21] Appl. No.: 725,948

[22] Filed: Oct. 7, 1996

Related U.S. Application Data

[63] Continuation of Ser. No. 145,741, Nov. 4, 1993, abandoned.

[30] Foreign Application Priority Data

| Nov. 9, 1992 | [JP] | Japan | 4-298370 |
| Oct. 18, 1993 | [JP] | Japan | 5-259698 |

[51] Int. Cl.$^6$ ........................................... B60J 5/04
[52] U.S. Cl. ........................................ 296/146.6; 280/751
[58] Field of Search ............. 145/741; 296/146.5–146.7, 296/188, 189; 280/751, 753; 49/502, 503

[56] References Cited

U.S. PATENT DOCUMENTS

| 2,477,933 | 8/1949 | Labser | 280/753 |
| 3,868,796 | 3/1975 | Bush | 296/146.6 X |
| 4,411,466 | 10/1983 | Koike | 296/146.6 X |
| 5,141,279 | 8/1992 | Weller | 296/146.7 |
| 5,306,066 | 4/1994 | Saathoff | 296/146.6 |
| 5,395,135 | 3/1995 | Lim et al. | 280/751 |

FOREIGN PATENT DOCUMENTS

| 53-147323 | 12/1978 | Japan . | |
| 4169346 | 6/1992 | Japan | 296/146.7 |
| 4362415 | 12/1992 | Japan | 296/146.6 |
| 1441598 | 7/1976 | United Kingdom | 280/751 |

*Primary Examiner*—Dennis H. Pedder
*Attorney, Agent, or Firm*—Martin Fleit

[57] ABSTRACT

A door structure of a motor vehicle has an inner panel and an outer panel. The door structure includes an impact load absorber member, provided at an outer panel side of the door, for absorbing and reducing a side collision impact load acting on a passenger by contact with the passenger. An opening is provided in the inner panel for allowing at least one portion of the impact load absorber member to enter. An passenger is compartment of the vehicle during a side collision. A supporting device is provided in the door for supporting the impact load absorber member.

51 Claims, 7 Drawing Sheets

FIG. I

DOOR STRUCTURE OF MOTOR VEHICLE

This is a continuation of application No. 08/145,741, filed Nov. 4, 1993, abandoned.

BACKGROUND OF THE INVENTION

1. Field of the Invention

The present invention relates to a door structure of a motor vehicle and, in particular to a door structure of a motor vehicle which includes an impact load absorber member for absorbing impact load during a side collision.

2. Description of Related Art

There is known a conventional motor vehicle which is provided with a door structure including an outer panel and an inner panel. The door includes an impact bar for absorbing an impact load during a side collision into the door. The impact bar absorbs the impact load from the side collision by deformation and movement thereof toward the inner panel. The impact bar extends within the door in front/rear direction of a vehicle body and is located near the outer panel in order to avoid contact with a vertically movable door window glass provided in the door. The conventional vehicle further includes an impact load absorber disposed inward, i.e. on the passenger compartment side, of the part of the inner panel opposite the impact bar. The impact load absorber is for absorbing impact load acting on the passengers from the side. Such a conventional vehicle including the impact load absorber is disclosed in, for example, Japanese Patent Laid-Open Publication No. 53-147323.

However, since the impact load absorber is provided in the passenger compartment in the above-mentioned conventional vehicle, it reduces the size of the passenger compartment and makes it less comfortable.

SUMMARY OF THE INVENTION

It is, therefore, an object of the present invention to provide a door structure of a motor vehicle which enhances the comfort of the vehicle passenger compartment.

It is another object of the present invention to provide a door structure of a motor vehicle which can effectively absorb and reduce an impact load acting on a passenger from the side.

These and other objects are achieved according to the present invention by providing a door structure of a motor vehicle having an inner panel and an outer panel, comprising, an impact load absorber member provided at an outer panel side of the door for absorbing and reducing a side collision impact load acting on a passenger by contact with the passenger, opening means provided in the inner panel for allowing at least one portion of the impact load absorber member to enter a passenger compartment of the vehicle during a side collision, and means provided in the door for supporting the impact load absorber member.

In a preferred embodiment of the present invention, the supporting means includes an impact bar extending in a front/rear direction at an outer panel side of the door.

In another embodiment of the present invention, the supporting means includes a beltline reinforcement extending in a front/rear direction at an outer panel side of the door.

In still another embodiment of the present invention, the supporting means includes an impact bar extending in a front/rear direction in the door and a beltline reinforcement extending in the front/rear direction at an outer panel side of the door.

The above and other objects and features of the present invention will be apparent from the following description and by making reference to the accompanying drawings which are employed for illustrating preferred embodiments of the present invention.

DESCRIPTION OF THE PREFERRED EMBODIMENTS

The present invention will now be explained with reference to preferred embodiments and the drawings.

Figure 1:
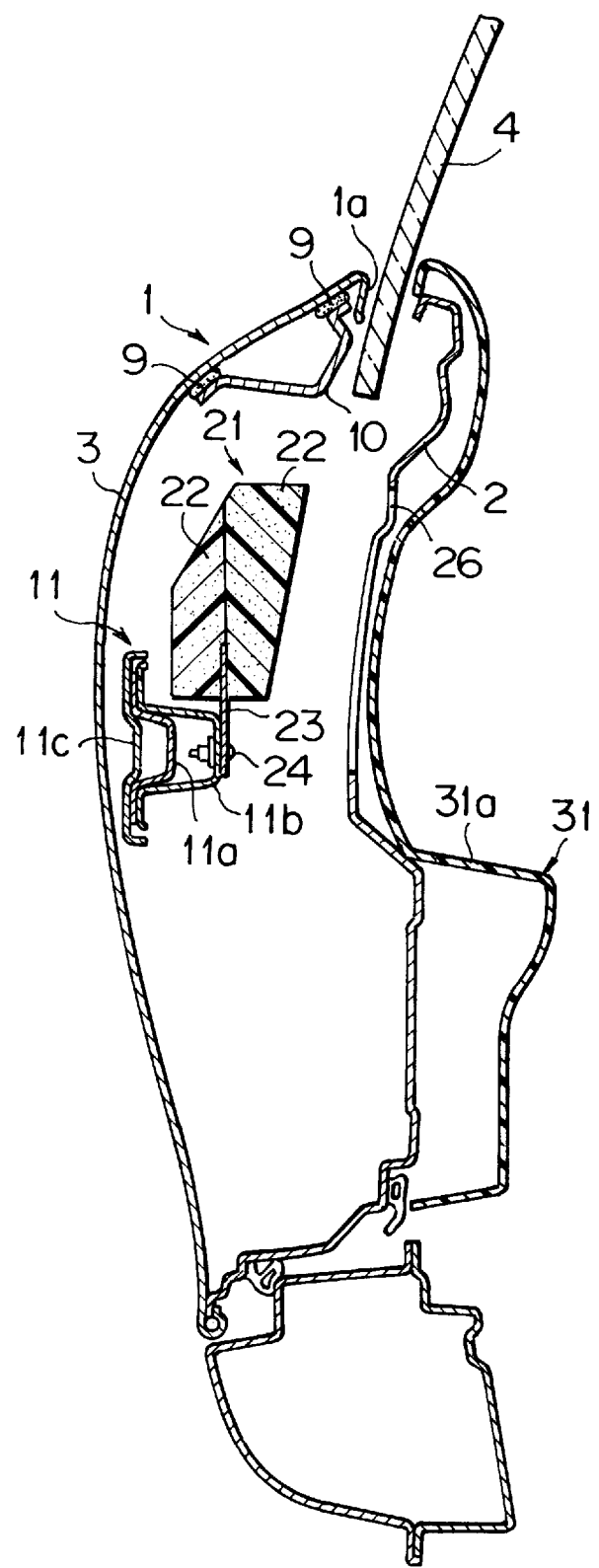
FIG. 1 is a vertical sectional view showing a front side door vertically cut at an opening of an inner panel in accordance with a first embodiment of the present invention.
Figure 2:
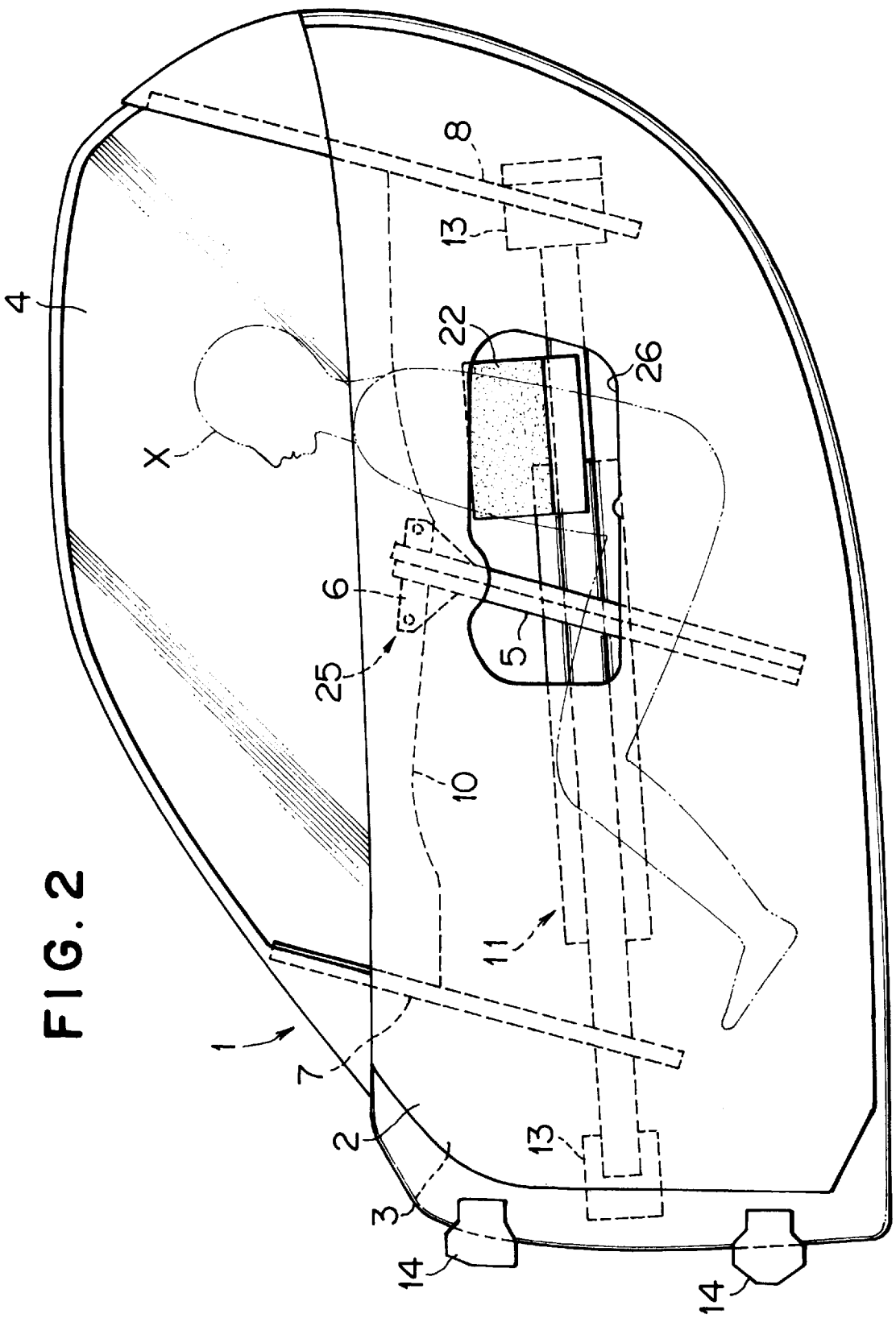
FIG. 2 is a side view showing the front side door as viewed from inside the passenger compartment of the vehicle in accordance with the first embodiment of the present invention.

Referring to FIGS. 1 and 2, a first embodiment of the present invention will be explained. Reference numeral 1 designates the right front side door of a motor vehicle. The door 1 has an inner panel 2 and an outer panel 3 and is provided with an opening 1a between the upper ends of the inner panel 2 and the outer panel 3 for communicating the inner side of the door 1 with the exterior. A window glass 4 is inserted into the opening 1a of the door 1 and operated so as to open and close a window.

The central portion of the lower end of the window glass 4 is supported through a slider 6 by a central guide 5 extending vertically at the central portion in the front/rear direction in the door 1. The window glass 4 is further supported at front and rear portions thereof by a front glass guide 7 extending vertically at a front portion of the door 1 and a rear glass guide 8 extending vertically at a rear portion in the door 1. The front glass guide 7 and rear glass guide 8 have U-shaped sections. The window glass 4 can be operated to move up and down along the glass guides 5, 7 and 8.

The front side door 1 is provided with a beltline reinforcement 10 extending in the front/rear direction at a beltline located at the upper edge of the door 1. The beltline reinforcement 10 is secured at both the upper and lower edges thereof to the outer panel 3 via fillers 9 so as to form a closed section in the door 1 together with the outer panel 3 and is secured at the front and rear ends thereof to the inner panel 2 and the outer panel 3. The beltline reinforcement 10 is disposed at substantially the same height as the shoulders of a seated passenger X, and absorbs a side collision impact load by its deformation and movement toward the inner panel 2.

Figure 3:
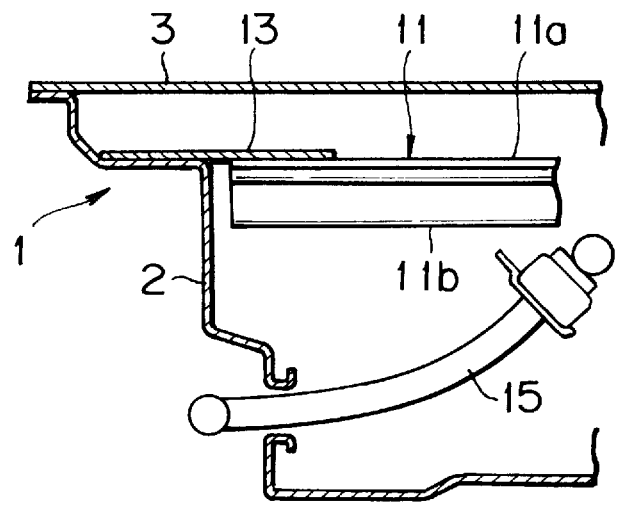
FIG. 3 is a horizontal sectional view showing the front side door horizontally cut at the front portion of an impact bar in accordance with the first embodiment of the present invention.

An impact bar 11 is provided in the front side door 1 to extend in the front/rear direction of the vehicle body. The impact bar 11 is located at a vertically intermediate height corresponding to the height of a motor vehicle bumper, since the impact load from the side in a side collision is most likely to act on the door 1 at this intermediate height. The impact bar 11 is arranged so as to cross at right angles with the trunk of the seated passenger X. In addition, the impact bar 11 is located in the door 1 between the outer panel 3 and the glass guides 5, 7 and 8 so that it can absorb the side impact load during the collision by its deformation and movement toward the inner panel 2. As shown in FIG. 3, the impact bar 11 is secured at its front end to a bracket 13 secured to the inner panel 2 projecting toward the outer panel 3. The rear end of the impact bar 11 is similarly secured.

Referring back to FIG. 1, the impact bar 11 includes an outer base 11a of a substantially hat-shaped section which extend in the front/rear direction on the side of the outer panel 3, an inner base 11b of a substantially hat-shaped section which is disposed between the outer base 11a and the glass guides 5, 7 and 8 and is secured at the upper and lower edges thereof to the upper and lower edges of the outer base 11a so as to form a closed section with the outer base 11a, and a plane base 11c which is disposed between the outer panel 3 and the outer base 11a and is secured at the upper and lower edges thereof to the upper and lower ends of the outer base 11a so as to form a closed section with the outer base 11a.

The door 1 is connected to the vehicle body, by door hinges 14 as shown in FIG. 2, and a door checker 15 prevents the front side door 1 from opening beyond a predetermined angle, as shown in FIG. 3.

Figure 4:
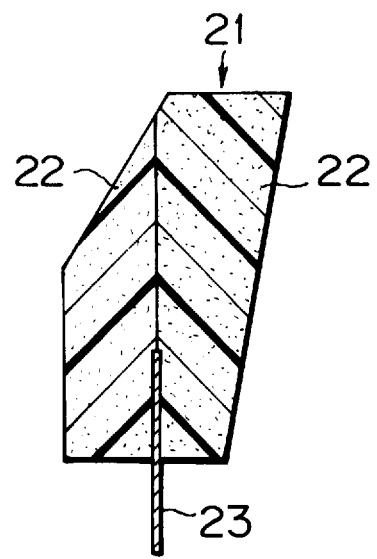
FIG. 4 is a vertical sectional view showing an impact load absorber member in accordance with the first embodiment of the present invention.

Referring to FIG. 4 in addition to FIGS. 1 and 2, the door 1 is provided with an impact load absorber member 21 disposed above the impact bar 11 at the height of the trunk of the seated passenger X where it absorbs collision impact load directly acting on the passenger X. The impact load absorber member 21 includes two separate pads 22 which are made out of relatively soft elastic material. The absorber member 21 is secured at the jointed surfaces of the pads 22 to a bracket 23 secured to the inner base 11b of the impact bar 11 by screws 24. That is to say, the impact bar 11 supports the impact load absorber member 11.

Referring back to FIG. 2, the door 1 is provided with a window glass regulator 25 including the above-mentioned glass guide 5 and slider 6. The inner panel 2 of the door 1 is provided at its central portion with an opening 26. The upper rear portion of the opening 26 is located opposite the impact load absorber member 21, and therefore, the absorber member 21 can be moved into the passenger compartment of the vehicle through the opening 26 of the inner panel 2 by the impact load in the side direction generated in a side collision. The window glass regulator 25 is mounted through the opening 26.

A trim member 31 is attached to the inner side of the inner panel 2 of the door 1. The trim member 31 is ruptured by the impact load absorber member 21 as it moves into the passenger compartment through the opening portion 26 during the side collision and therefore, the trim member 31 does not substantially interfere with the movement of the absorber member 21 the passenger compartment of the vehicle. The trim member 31 is formed to have an arm rest 31a at a height corresponding to the lower trunk region of the passenger X.

According to the first embodiment of the present invention, when a side collision occurs, the side impact load moves the impact bar 11 and the impact load absorber member 21 toward the inner panel 2 into contact with the glass guides 5, 7 and 8. Thereafter the impact bar 11 is deformed further and strikes inner panel 2 together with the glass guides 5, 7 and 8, so that the impact bar 11 and the glass guides 5, 7 and 8 together absorb the side impact load while the inner panel 2 prevents the impact bar 11 from moving into the passenger compartment. In contrast, the impact load absorber member 21 separates from the bracket 23 and then bursts into the passenger compartment through the opening portion 26. As a result, the impact load absorber member 21 can directly contact the trunk of the passenger X so that the side impact load acting on the passenger X can be absorbed and reduced. In addition, the arm rest 31a, which also has a cushioning effect, absorbs the side impact load acting on the lower trunk region of the passenger X.

As a result, since the impact load absorber member 21 bursts through the door 1 into the passenger compartment during a side collision, it, together with the arm rest 31a, absorbs and reduce the impact acting on the passenger X. This effect can be obtained even without providing the absorber member on the passenger compartment side.

Furthermore, since the absorber member 21 is installed above the impact bar 11 through the bracket 13, it and the impact bar 11 overlap in the width direction of the door 1. Therefore, the width of the door 1 can be reduced owing to the overlapping portions of the absorber member 21 and the impact bar 11.

Moreover, since the impact load absorber member 21 is not disposed in the passenger compartment but in the door 1, the passenger compartment becomes larger and more comfortable.

Figure 5:
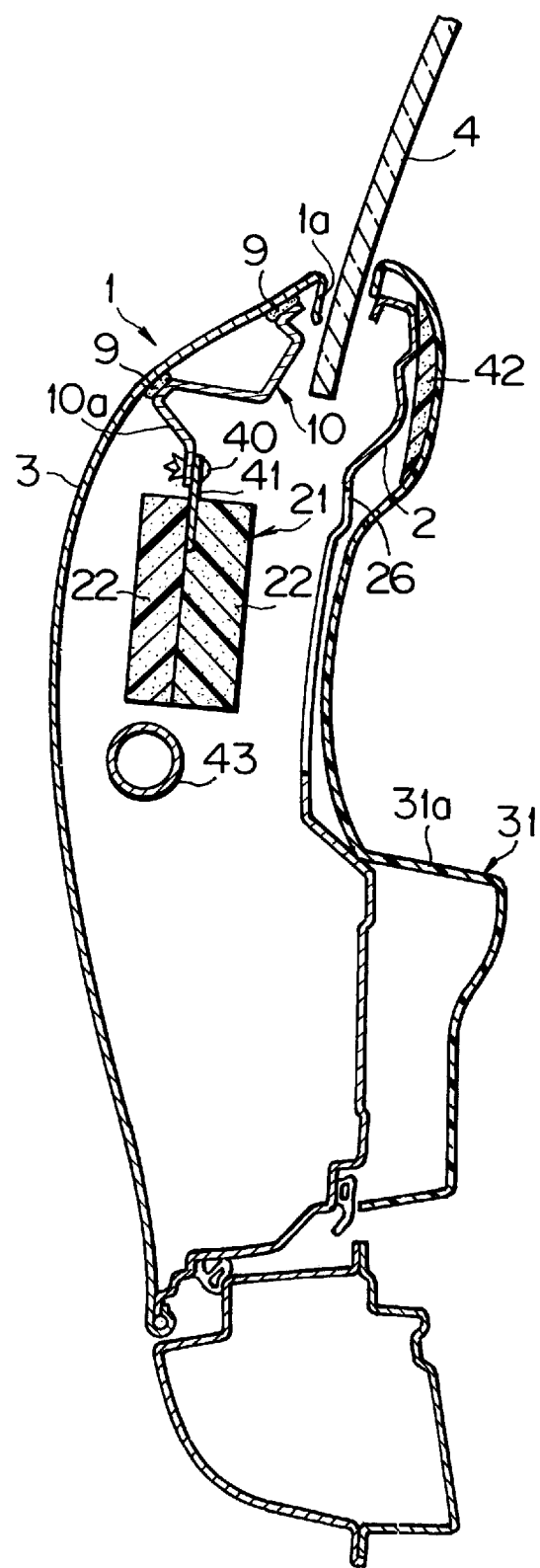
FIG. 5 is a vertical sectional view showing a front side door vertically cut at an opening of an inner panel in accordance with a second embodiment of the present invention.

A second embodiment of the present invention will next be described with reference to FIG. 5. In the second embodiment, the beltline reinforcement 10 includes a flange 10a extending downward. The flange 10a is connected with a bracket 41 secured by clips 40 to the upper portion of the jointed surfaces of the impact load absorber member 21. As a result, the beltline reinforcement 10 supports the impact load absorber member 21 via the flange 10a and the bracket 41.

An upper impact load absorber member 42 is installed between the inner panel 2 and the trim member 31 at the height of the beltline reinforcement 10. It has a smaller width than that of the absorber member 21. Further the upper impact load absorber member 42 is positioned to be opposite the shoulders of the passenger X and it therefore absorbs the side impact load acting on the shoulders of the passenger X by contact with the shoulders together with the trim member 31. The door 1 is provided with an impact bar 43 of tube-shaped section. Other elements in the second embodiment are as same as those in the first embodiment of the present invention.

According to the second embodiment of the present invention, when a side collision occurs, the side impact load moves the beltline reinforcement 10, together with the impact load absorber member 21 and the impact bar 43, toward the inner panel 2 and into contact with the glass guides 5, 7 and 8. Thereafter the beltline reinforcement 10 and the impact bar 43 are deformed further and move onto the inner panel 2 together with the glass guides 5, 7 and 8, so that the beltline reinforcement 10 and the impact bar 43, together with the glass guides 5, 7 and 8, absorb the side impact load in the side collision, while the inner panel 2 prevents both the beltline reinforcement 10 and the impact bar 43 from moving into the passenger compartment. In contrast, the impact load absorber member 21 separates from the bracket 41 and the beltline reinforcement 10 and bursts into the passenger compartment through the opening 26. As a result, the impact load absorber member 21 makes direct contact with the trunk of the passenger X so that the side impact load acting on the lower trunk region of the passenger X can be absorbed and reduced.

Furthermore, when the beltline reinforcement 10 moves onto the inner panel 2, the upper impact load absorber member 42 effectively absorbs the side impact load so that the impact load acting on the shoulders of the passenger X is absorbed and reduced.

Additionally, the arm rest 31a, which also has a cushioning effect, can absorb the side impact load applied to the lower trunk region of the passenger X together with the impact load absorber member 21.

Since the upper impact load absorber member 42 has a smaller width than that of the absorber member 21, the amount of projection of the upper absorber member 42 into the passenger compartment can be minimized. As a result, the passenger compartment becomes larger and more comfortable.

Figure 6:
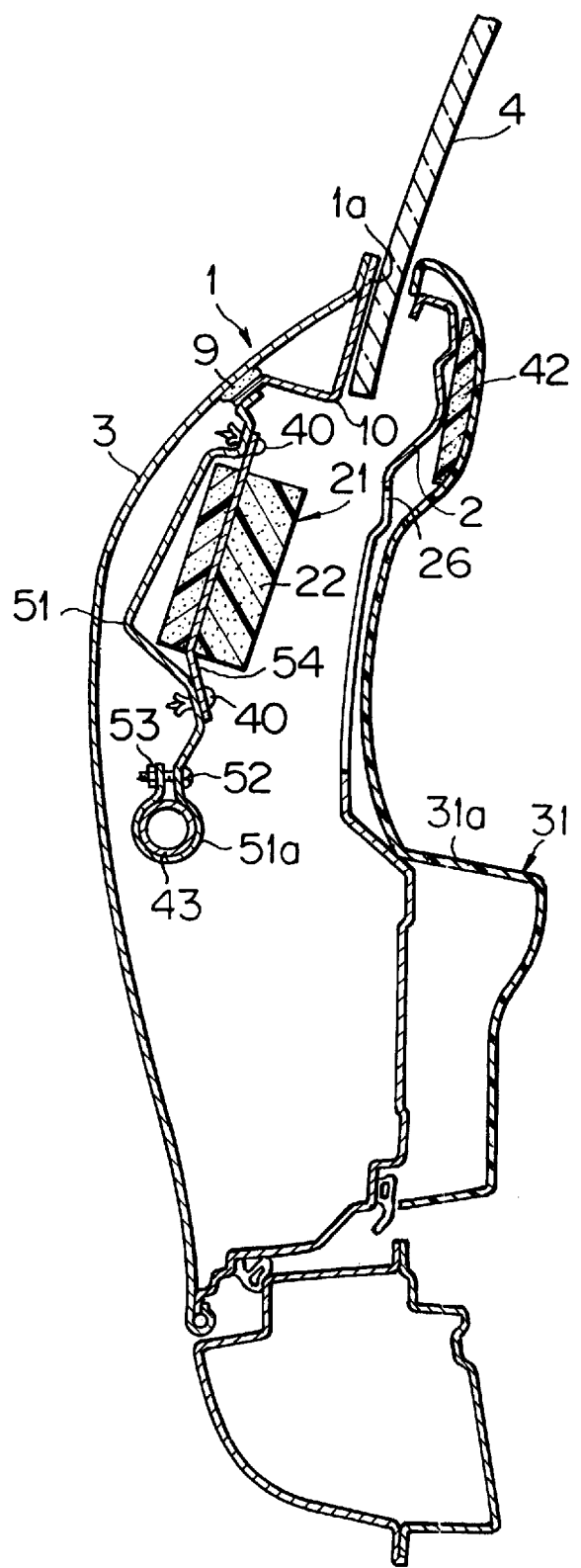
FIG. 6 is a vertical sectional view showing a front side door vertically cut at an opening of an inner panel in accordance with a third embodiment of the present invention.

A third embodiment of the present invention will next be described with reference to FIG. 6. In the third embodiment, the beltline reinforcement 10 and the impact bar 43 are connected with each other by a support bracket 51. More specifically, the support bracket 51 is secured at its upper end to the lower portion of the beltline reinforcement 10 and at its lower end to the impact bar 43 through a support member 51a. The support member 51a is attached so as to enclose the impact bar 43 and is secured by a bolt 52 and a nut 53.

The impact load absorber member 21 is disposed on the inner side of the support bracket 51 and is provided with a bracket 54 adhered to the jointed surfaces of the pads 22. The bracket 54 of the absorber member 21 is secured at its upper end portion to its upper portion of the support bracket 51 and at its lower end portion to its lower portion of the support bracket 51, by clips 40. As a result, the impact load absorber member 21 is supported by both the beltline reinforcement 10 and the impact bar 43.

An upper impact load absorber member 42 is additionally provided between the inner panel 2 and the trim member 31 and at the height of the beltline reinforcement 10. It has a smaller width than the absorber member 21.

According to the third embodiment of the present invention, when a side collision occurs, the side impact load moves the beltline reinforcement 10 together with the impact load absorber member 21 and the impact bar 43, toward the inner panel 2 and into contact with the glass guides 5, 7 and 8. Thereafter the beltline reinforcement 10 and the impact bar 43 are deformed further and move onto the inner panel 2 together with the glass guides 5, 7 and 8, so that the beltline reinforcement 10 and the impact bar 43, together with the glass guides 5, 7 and 8, absorb the side impact load in the side collision, while the inner panel 2 prevents both the beltline reinforcement 10 and the impact bar 43 from moving into the passenger compartment. In contrast, the impact load absorber member 21 separates from the support bracket 51 and bursts into the passenger compartment through the opening portion 26. As a result, the impact load absorber member 21 makes direct contact with the trunk of the passenger X so that the side impact load acting on the lower trunk region of the passenger X can be absorbed and reduced.

Furthermore, when the beltline reinforcement 10 moves onto the inner panel 2, the upper impact load absorber member 42 effectively absorbs the side impact load so that the impact load acting on the shoulders of the passenger X is absorbed and reduced.

Additionally, the arm rest 31a, which also has a cushioning effect, can absorb the side impact load acting on the lower trunk region of the passenger X together with the impact load absorber member 21.

As a result, since the impact load absorber member 21 and the upper impact load absorber member 42 are arranged in the above-mentioned ways, the passenger compartment becomes larger and more comfortable in the passenger compartment.

Figure 7:
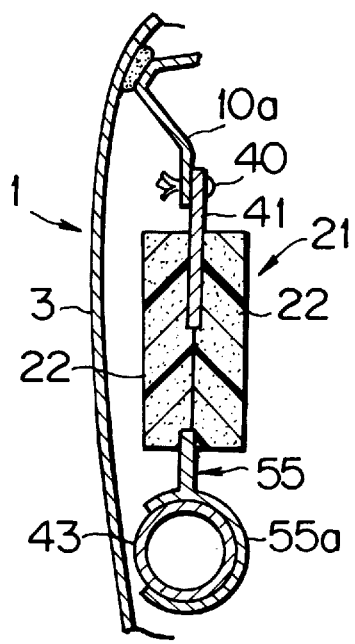
FIG. 7 is a vertical sectional view showings an impact load absorber member and other members in the front side door in accordance with another aspect of the third embodiment of the present invention.

FIG. 7 illustrates a variation of the third embodiment of the present invention. Where the space between the outer panel 3 and the impact bar 43 is very narrow, it is hard to provide the support bracket 51 shown in FIG. 6. Therefore, in this aspect of the third embodiment, the impact load absorber member 21 is provided at its upper portion with a bracket 41 and at its lower portion with a support bracket 55. Both the bracket 41 and the support bracket 55 are attached at the jointed surfaces of the pads 22. The upper portion of the bracket 41 is attached to the beltline reinforcement 10 by clips 40, and the support bracket 55 is provided at its lower portion with a fitting portion 55a fitting with substantially three fourths of the surface of the impact bar 43.

In assembling the above-mentioned elements, the bracket 41, the impact load absorber member 21 and the support bracket are first sub-assembled, the fitting portion 55a of the support bracket 5 is fitted onto the impact bar 43 and finally the upper portion of the bracket 41 is connected to the lower end of the beltline reinforcement 10 by the clips 40.

Figure 8:
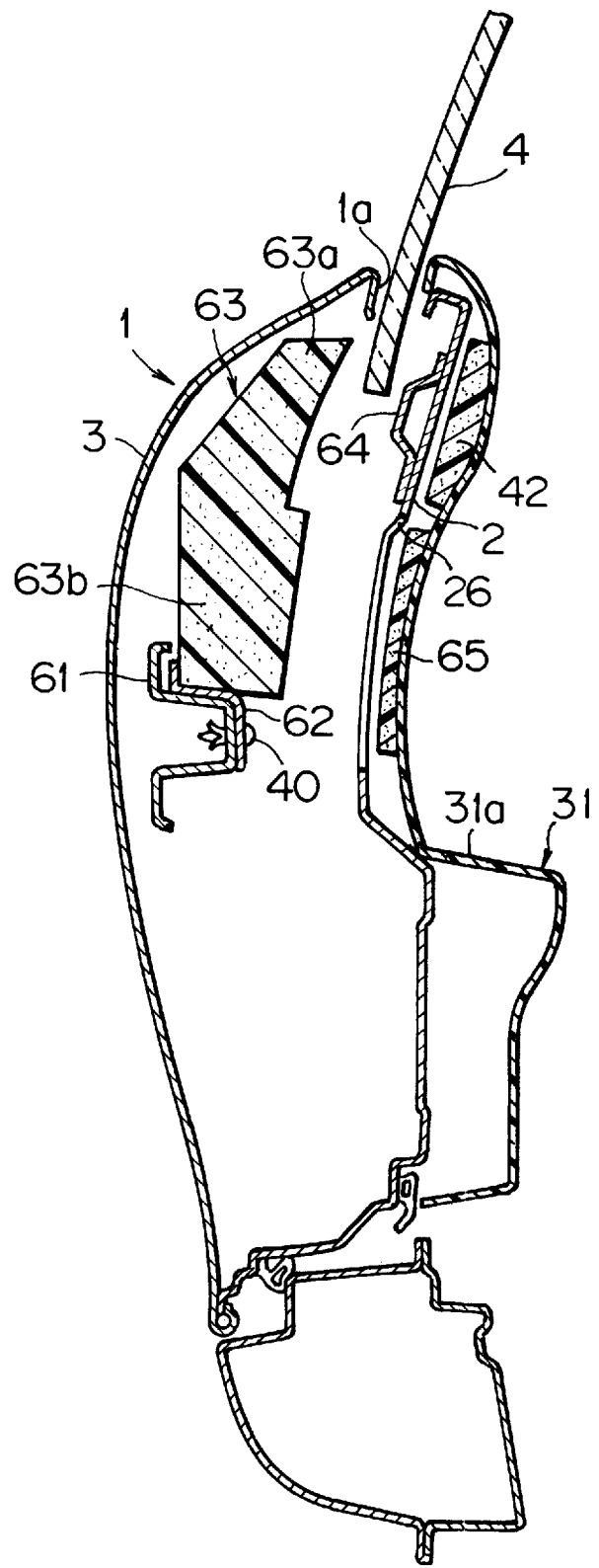
FIG. 8 is a vertical sectional view showing a front side door vertically cut at an opening of an inner panel in accordance with a fourth embodiment of the present invention.

A fourth embodiment of the present invention will next be described with reference to FIG. 8. In the fourth embodiment, an impact bar 61 has a substantially hat-shaped section and has an opening to the outer panel 3. A bracket 62 with a substantially L-shaped section is attached by clips 40 on the upper horizontal and vertical surfaces of the impact bar 61. The bracket 62 supports an impact load absorber member 63. More specifically, the lower surface of the absorber member 63 is adhered to the upper surface of the bracket 62.

The impact load absorber member 63 includes an upper portion 63a and a lower portion 63b whose thicknesses are 60 millimeters and 75 millimeters, respectively. The upper portion 63a of the absorber member 63 is disposed at the height of the shoulders of the passenger X and the lower portion 63b of the absorber member 63 is disposed at the height of the lower trunk region of the passenger X.

A beltline reinforcement 64 is provided on the inner side of the upper portion of the inner panel 2 at the height of the shoulders of the passenger X. Furthermore, an upper impact load absorber member 42 is installed between the inner panel 2 and the trim member 31 at the height of the beltline reinforcement 64. Moreover, a lower impact load absorber member 65 is installed between the inner panel 2 and the trim member 31 at the height of the opening 26 of the inner panel 2 and the lower portion 63b of the impact load absorber member 63. The thicknesses of the upper impact load absorber member 42 and the lower load absorber member 65 are 25 millimeters and 20 millimeters, respectively.

According to the fourth embodiment of the present invention, when a side collision occurs, the side impact load moves the impact bar 61, together with the impact load absorber member 63, toward the inner panel 2 and into contact with the glass guides 5, 7 and 8. Thereafter the impact bar 61 is deformed further and moves onto the inner panel 2 together with the glass guides 5, 7 and 8, so that the impact bar 61, together with the glass guides 5, 7 and 8, absorbs the side impact load in the side crash and the inner panel 2 prevents the impact bar 61 from moving into the passenger compartment.

In contrast, the lower portion 63b of the impact load absorber member 63 is able to burst into the passenger compartment through the opening 26. As a result, since the impact load absorber member 63 contacts elastically with the lower impact load absorber member 65 and then contacts with the trunk of the seated passenger X through the lower impact load absorber member 62, the absorber member 63 and the lower absorber member 65 can absorb and reduce the impact load acting on the lower trunk region of the passenger X in two stages.

Furthermore, the upper portion 63a of the impact load absorber member 63 moves toward the inner panel 2 owing to the deformation of the outer panel 3 and contacts with the beltline reinforcement 64 on the inner panel 2 so that the inner panel 2 prevents the upper portion 63a of the absorber member 63 from moving into the passenger compartment. Then the upper portion 63a of the absorber member 63 contacts with the upper impact load absorber member 42 and thereafter contacts with the body of the passenger X through the absorber member 42. As a result, the absorber member 63 and the upper absorber member 42 can in two stages absorb and reduce the side collision acting on the shoulders of the passenger X.

As a result, the side impact load acting on the lower trunk region of the passenger X can be effectively absorbed by the deformation and movement of the impact bar 61 and can be stepwisely absorbed by the impact load absorber member 63, the lower impact load absorber member 65 and the cushioning effect of the arm rest 31a. On the other hand, the side impact load acting on the shoulders of the passenger X can be effectively absorbed by the beltline reinforcement 64 and can be more effectively absorbed by the upper portion 63a of the absorber member 63 and the upper absorber member 42. Moreover, since the upper impact load absorber member 42 and the lower impact load absorber member 65 are arranged in the above-mentioned ways, the passenger compartment becomes larger and more comfortable.

According to the present invention, there may be provided an impact load absorber member disposed under an impact bar or at the inner side of the impact bar.

Furthermore, according to the present invention, there may be provided an impact bar which has a vertically double closed section or a section consisting of a plain base and a hat-shaped base.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. A door structure of a motor vehicle having an inner panel and an outer panel comprising:
    an impact load absorber member, provided within a space defined by the inner panel and the outer panel, for absorbing and reducing a side collision impact load acting on a passenger during a side collision;
    opening means, provided in the inner panel, for allowing at least one portion of said impact load absorber member to move toward a passenger compartment of the vehicle from the space by the side collision impact load;
    supporting means provided in the door, for supporting said impact load absorber member; and
    a trim member disposed at a passenger compartment side of the inner panel, the trim member being contacted by the impact load absorber member when the impact load absorber member moves toward the passenger compartment.

2. A door structure of a motor vehicle according to claim 1, wherein said supporting means includes an impact bar extending in a front and rear direction at an outer panel side of the door.

3. A door structure of a motor vehicle according to claim 2, wherein a passenger compartment side end portion of the impact load absorber member is located closer to the passenger compartment than a passenger compartment side end portion of the impact bar.

4. A door structure of a motor vehicle according to claim 3, wherein said trim member has a cushioning effect and is ruptured by said impact load absorber member moving into the passenger compartment through said opening means.

5. A door structure of a motor vehicle according to claim 1, wherein said supporting means is provided on the outer panel.

6. A door structure of a motor vehicle according to claim 5, wherein said door structure further comprises a trim member disposed at a passenger compartment side of the inner panel, the trim member being contacted by the impact load absorber member when the impact load absorber member moves toward the passenger compartment.

7. A door structure of a motor vehicle according to claim 6, wherein said impact load absorber member moves through said opening means after it contacts said trim member.

8. A door structure of a motor vehicle according to claim 5, wherein said supporting means includes a beltline reinforcement extending in a front and rear direction at an outer panel side in the door.

9. A door structure of a motor vehicle according to claim 1, wherein said supporting means includes an impact bar extending in a front and rear direction in the door and a beltline reinforcement extending in the front and rear direction at an outer panel side of the door.

10. A door structure of a motor vehicle according to claim 2, wherein said impact load absorber member is provided above said impact bar.

11. A door structure of a motor vehicle according to claim 9, wherein said impact load absorber member is provided above said impact bar.

12. A door structure of a motor vehicle according to claim 1, further comprising a beltline reinforcement which extends in a front/rear direction in the door and is located above the opening means.

13. A door structure of a motor vehicle according to claim 1, further comprising a plurality of glass guides extending vertically in the door, and located inward from the supporting means, for guiding a window glass.

14. A door structure of a motor vehicle according to claim 1, wherein said trim member has a cushioning effect and is ruptured by said impact load absorber member moving into the passenger compartment through said opening means.

15. A door structure of a motor vehicle according to claim 14, further comprising an upper impact load absorber member provided between the inner panel and the trim member and having a thickness smaller than that of said impact load absorber member.

16. A door structure of a motor vehicle according to claim 14, further comprising a lower impact load absorber member provided between the inner panel and the trim member and having a thickness smaller than that of said impact load absorber member.

17. A door structure of a motor vehicle according to claim 1, wherein said impact load absorber member is provided at an outer panel side of the door.

18. A door structure of a motor vehicle according to claim 1, wherein at least a portion of said impact load absorber member is aligned with the opening means.

19. A door structure of a motor vehicle according to claim 18, wherein said opening means is smaller than said impact load absorber member.

20. A door structure of a motor vehicle according to claim 1, wherein said opening means is larger than said impact load absorber member.

21. A door structure of a motor vehicle according to claim 1, wherein said impact load absorber member moves through said opening means after it contacts said trim member.

22. A door structure of a motor vehicle having an inner panel and an outer panel, comprising:
   an impact load absorber member provided for absorbing and reducing a side collision impact load acting on a passenger by contact with the passenger;
   opening means provided in the inner panel for allowing at least one portion of said impact load absorber member to enter a passenger compartment of the vehicle during a side collision;
   means provided in the door for supporting said impact load absorber member; and
   a trim member disposed at a passenger compartment side of the inner panel, the trim member being contacted by a lower portion of the impact load absorber member when the lower portion of the impact load absorber member moves toward the passenger compartments;
   wherein said impact load absorber member includes an upper portion and said lower portion, said upper portion having a thickness smaller than that of the lower portion, said lower portion moving into the passenger compartment through the opening means during the side collision.

23. A door structure of a motor vehicle according to claim 22, wherein said impact load absorber member is provided at an outer panel side of the door.

24. A door structure of a motor vehicle according to claim 22, wherein said supporting means includes an impact bar extending in a front and rear direction at an outer panel side of the door.

25. A door structure of a motor vehicle according to claim 24, wherein said impact load absorber member is provided above said impact bar.

26. A door structure of a motor vehicle according to claim 24, wherein a passenger compartment side end portion of the impact load absorber member is located closer to the passenger compartment than a passenger compartment side end portion of the impact bar.

27. A door structure of a motor vehicle according to claim 26, wherein said trim member has a cushioning effect and is ruptured by said lower portion of the impact load absorber member moving into the passenger compartment through the opening means.

28. A door structure of a motor vehicle according to claim 22, wherein said door structure further comprises a beltline reinforcement which extends in a front and rear direction in the door and is located above the opening means.

29. A door structure of a motor vehicle according to claim 22, wherein said door structure further comprises a plurality of glass guides, extending upwardly and downwardly in the door and located inward from the supporting means, for guiding a window glass.

30. A door structure of a motor vehicle according to claim 22, wherein said trim member has a cushioning effect and is ruptured by said lower portion of the impact load absorber member moving into the passenger compartment through the opening means.

31. A door structure of a motor vehicle according to claim 30, wherein said door structure further comprises an upper impact load absorber member provided between the inner panel and the trim member and having a thickness smaller than that of said impact load absorber member.

32. A door structure of a motor vehicle according to claim 30, wherein said door structure further comprises a lower impact load absorber member provided between the inner panel and the trim member and having a thickness smaller than that of said impact load absorber member.

33. A door structure of a motor vehicle having an inner panel and an outer panel, comprising:
   a first impact load absorber member, provided within a space defined by the inner panel and the outer panel and spaced from the outer panel, for absorbing and reducing a side collision impact load acting on a passenger during a side collision;
   an impact bar extending in the space defined by the inner panel and the outer panel for supporting the first impact load absorber member;
   a trim member provided at a passenger compartment side of the inner panel; and
   a second impact load absorber member, provided through a space between the inner panel and the trim member and spaced from the inner panel, for absorbing and reducing the side collision impact load;
   wherein said side collision impact load is absorbed and reduced in steps by a first contact of the outer panel and the first impact load absorber member, a second contact of the first impact load absorber member and the inner panel and a third contact of the inner panel and the second impact load absorber member during the side collision.

34. A door structure of a motor vehicle according to claim 33, wherein said second impact load absorber member is provided on the trim member.

35. A door structure of a motor vehicle according to claim 34, wherein said door structure further comprises a beltline reinforcement which extends in a front and rear direction in the door and is located at a height which is generally the same as that of the second impact load absorber member.

36. A door structure of a motor vehicle according to claim 34, wherein said door structure further comprises a third impact load absorber member, provided below the second impact load absorber member, for absorbing and reducing the side collision impact load.

37. A door structure of a motor vehicle according to claim 36, wherein said first impact load absorber member is aligned with at least parts of the second and third impact load absorber members.

38. A door structure of a motor vehicle according to claim 37, wherein said door structure further comprises opening means, provided in the inner panel so as to correspond to a location of the third impact load absorber member, for allowing at least one portion of said first impact load absorber member to move toward a passenger compartment of the vehicle from the space and contact the third impact load absorber member during the side collision.

39. A door structure of a motor vehicle according to claim 34, wherein said impact bar extends in a front and rear direction in the door.

40. A door structure of a motor vehicle according to claim 39, wherein a passenger compartment side end portion of the first impact load absorber member is located closer to the passenger compartment than a passenger compartment side end portion of the impact bar.

41. A door structure of a motor vehicle according to claim 33, wherein said impact bar extends in a front and rear direction in the door.

42. A door structure of a motor vehicle according to claim 41, wherein a passenger compartment side end portion of the first impact load absorber member is located closer to the passenger compartment than a passenger compartment side end portion of the impact bar.

43. A door structure of a motor vehicle according to claim 33, wherein said first impact load absorber member is provided at an outer panel side of the door.

44. A door structure of a motor vehicle having an inner panel and an outer panel, comprising:

a first impact load absorber member, provided within a space defined by the inner panel and the outer panel, for absorbing and reducing a side collision impact load acting on a passenger during a side collision;

a trim member provided at a passenger compartment side of the inner panel;

a second impact load absorber member, provided between the inner panel and the trim member, for absorbing and reducing the side collision impact load; and opening means, provided in the inner panel so as to correspond to a location of the second impact load absorber member, for allowing at least one portion of said first impact load absorber member to move toward a passenger compartment of the vehicle from the space and contact with the second impact load absorber member during the side collision.

45. A door structure of a motor vehicle according to claim 44, wherein said second impact load absorber member is provided on the trim member.

46. A door structure of a motor vehicle according to claim 45, wherein said first impact load absorber member is larger than the opening means.

47. A door structure of a motor vehicle according to claim 45, wherein said door structure further comprises an impact bar which extends in a front and rear direction in the door and supports the first impact load absorber member.

48. A door structure of a motor vehicle according to claim 44, wherein said door structure further comprises an impact bar which extends in a front and rear direction in the door and supports the first impact load absorber member.

49. A door structure of a motor vehicle according to claim 44, wherein said first impact load absorber member is provided at an outer panel side of the door.

50. A door structure of a motor vehicle according to claim 47, wherein a passenger compartment side end portion of the first impact load absorber member is located closer to the passenger compartment than a passenger compartment side end portion of the impact bar.

51. A door structure of a motor vehicle according to claim 48, wherein a passenger compartment side end portion of the first impact load absorber member is located closer to the passenger compartment than a passenger compartment side end portion of the impact bar.

* * * * *